Patented Sept. 14, 1954

2,689,259

UNITED STATES PATENT OFFICE 2,689,259

PRODUCTION OF TRIMETHYL BORATE

William H. Schechter, Zelienople, Pa., assignor, by mesne assignments, to Callery Chemical Company, Pittsburgh, Pa., a corporation of Pennsylvania No Drawing. Application August 29, 1951, Serial No. 244,267

5 Claims. (Cl. 260—462)

This invention relates to the production of trimethyl borate.

It is among the objects of the invention to provide a method of making trimethyl borate that is simple, rapid, easily practiced and controlled, and is productive of trimethyl borate in high yield and in a high state of purity free, or substantially free, from methyl alcohol.

The common method of making trimethyl borate ($B(OCH_3)_3$) has been to react a preformed mixture of orthoboric acid ($H_3BO_3$) or boric oxide ($B_2O_3$) and methyl alcohol ($CH_3OH$). Distillation of such a reaction product yields an azeotropic mixture of methyl borate and methyl alcohol containing about 70 to 72 per cent of trimethyl borate. The separation of those two components has required the use of a drying agent such as sulfuric acid ($H_2SO_4$), calcium chloride ($CaCl_2$) or lithium chloride (LiCl). While the first two of those agents are relatively inexpensive, the use of all such agents entails their cost and that of the additional operation its use involves. Lithium chloride is the easiest drying agent to use but it is expensive.

I have discovered, and it is upon this that the invention is in large part predicated, that trimethyl borate may be produced easily and readily by adding boric oxide incrementally, i. e., slowly and in small amounts, to methyl alcohol, and that high yields of high purity trimethyl borate may then be recovered from the reaction mixture by distillation without the necessity for using a drying agent as has been necessary in the prior practice alluded to above.

To obtain maximum yields of trimethyl borate of maximum purity various factors must be observed including particularly the proportions of the reactants, temperature control, limitation of digestion of the reaction mixture, and vacuum distillation in recovery of the trimethyl borate.

In the practice of the invention it is important that the methyl alcohol and boric oxide be supplied in proportions productive of trimethyl borate and metaboric acid ($HBO_2$). Preferably the reactants are supplied corresponding substantially to the equation:

$$3CH_3OH + 2B_2O_3 = B(OCH_3)_3 + 3HBO_2$$

If the reactants are supplied in proportions such that orthoboric acid forms, there is a tendency to produce water ($H_2O$) due to the ease with which boric acid dehydrates, with resultant adverse effect upon the recovery of trimethyl borate of high purity.

The reaction is exothermic. Experience has shown that the reaction tends to go out of control at temperatures of the order of 70° C. or higher. At low temperatures there is a tendency for the reaction to be delayed and then to surge with development of an uncontrolled temperature rise. Consequently, in the practice of the invention the reaction mixture is maintained at a temperature above about 25° and below about 70° C., and most suitably between 35° C. and 60° C. This may be accomplished readily by the rate of addition of the boric oxide to the methanol, and by conducting the reaction in a container provided with heat exchange means, e. g., a kettle provided with a jacket through which a coolant, suitably water, is passed to maintain the reaction mixture within the optimum temperature range stated. The reaction mixture should be stirred during the addition of the boric oxide.

The purity of the trimethyl borate that may be recovered does not vary much depending on whether the products are distilled promptly or allowed to digest for a period of time after all of the boric oxide has been added. I have found, however, that the yield may be increased by digesting the reaction products for a limited time, as evidenced by the following actual data representing runs in all of which boric oxide was added to methyl alcohol in the proportion of 140 grams of the oxide to 96 grams of methanol. When the reaction products were distilled promptly after completion of the boric oxide the yield was from 70 to 71 per cent of trimethyl borate varying from 91 to 94 per cent purity. However, by digesting at 25° C. for one hour the yield was 77 per cent of 92 per cent purity methyl borate. Longer digestion reduces the yield; thus after two hours digestion at 25° C. the purity was 94 per cent but the yield dropped to 65 per cent, while six hours digestion reduced the yield to 25 per cent of 92 per cent purity.

I have discovered also that the yield and the purity are reduced if the reaction products are distilled at atmospheric pressure. However, high yield and high purity may be obtained by vacuum distillation, suitably of the order of 2 to 5 inches of mercury. The yields and purities obtained in the tests just referred to were obtained by distillation under that degree of vacuum.

It might be expected that since the difficulties that accrue from reacting an initial mixture of boric oxide and methyl alcohol are avoided by the incremental addition of boric oxide to the alcohol, the same result would follow by adding the methanol slowly and in small amounts to the boric oxide. Such is not the case, however, as I have found. This latter, reversed order of addition results only in a viscous product from which no methyl borate can be distilled.

If desired, the boric oxide may be suspended in a high boiling inert medium, such, for example, as dibutyl carbitol or hexyl ether, and the suspension then reacted with methanol. Experience has shown, however, that the yields of trimethyl borate are lower in this modification, averaging about 83 to 85 per cent of trimethyl borate according to my present experience.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. That method of making trimethyl borate comprising the steps of incrementally adding boric oxide to a body of methyl alcohol in proportions corresponding substantially to 2 mols of said oxide to 3 mols of said alcohol, while maintaining the temperature of the reaction body below about 70° C., and distilling trimethyl borate from the reaction product and condensing and recovering it.

2. That method of making trimethyl borate comprising the steps of incrementally adding boric oxide to a body of methyl alcohol in proportions corresponding substantially to 2 mols of said oxide to 3 mols of said alcohol while maintaining the temperature of the reaction body above about 25° C. and below about 70° C., and vacuum distilling trimethyl borate from the reaction products and condensing and recovering it.

3. That method of making trimethyl borate comprising the steps of incrementally adding boric oxide to a body of methyl alcohol in proportions corresponding substantially to 2 mols of said oxide to 3 mols of said alcohol while maintaining the temperature of the reaction body below about 60° C., then digesting the reaction products during not to exceed about one hour, and then vacuum distilling trimethyl borate from the reaction products and condensing and recovering it.

4. That method of making trimethyl borate comprising the steps of incrementally adding boric oxide to a body of methyl alcohol in proportions corresponding substantially to 2 mols of said oxide to 3 mols of said alcohol while maintaining the temperature of the reaction body between about 25° and 70° C., then digesting the products during not to exceed about one hour, and then vacuum distilling trimethyl borate from the reaction products and condensing and recovering it.

5. That method of making trimethyl borate comprising the steps of incrementally adding boric oxide to a body of methyl alcohol in proportions corresponding substantially to 2 mols of said oxide to 3 mols of said alcohol while maintaining the temperature of the reaction body between about 35° and 60° C., then digesting the products at about 25° C. during not to exceed about one hour, and then distilling trimethyl borate from the reaction products under a vacuum of about 4 to 5 inches of mercury, and condensing and recovering the trimethyl borate.

References Cited in the file of this patent

UNITED STATES PATENTS

| Number | Name | Date |
|---|---|---|
| 2,217,354 | Appel | Oct. 8, 1940 |

OTHER REFERENCES

Schiff: Liebig's Annalen (Supp.), vol. 5, pp. 158, 159 (1867).